United States Patent
Philip et al.

(10) Patent No.: US 9,244,880 B2
(45) Date of Patent: Jan. 26, 2016

(54) AUTOMATIC CONSTRUCTION OF DEADLOCK FREE INTERCONNECTS

(75) Inventors: Joji Philip, San Jose, CA (US); Sailesh Kumar, San Jose, CA (US); Eric Norige, E. Lansing, MI (US); Mahmud Hassan, San Carlos, CA (US); Sundari Mitra, Saratoga, CA (US)

(73) Assignee: NetSpeed Systems, San Jose, CA (US)

( * ) Notice: Subject to any disclaimer, the term of this patent is extended or adjusted under 35 U.S.C. 154(b) by 277 days.

(21) Appl. No.: 13/599,559

(22) Filed: Aug. 30, 2012

(65) Prior Publication Data

US 2014/0068132 A1 Mar. 6, 2014

(51) Int. Cl.
| | |
|---|---|
| G06F 13/36 | (2006.01) |
| G06F 15/173 | (2006.01) |
| G06F 15/78 | (2006.01) |
| H04L 12/721 | (2013.01) |

(52) U.S. Cl.
CPC ...... *G06F 15/17312* (2013.01); *G06F 15/7825* (2013.01); *H04L 45/06* (2013.01)

(58) Field of Classification Search
CPC .......... G06F 15/17312; G06F 15/7825; H04L 45/00
USPC ........................................................ 710/306
See application file for complete search history.

(56) References Cited

U.S. PATENT DOCUMENTS

| | | | | |
|---|---|---|---|---|
| 4,933,933 A | * | 6/1990 | Dally et al. | 370/406 |
| 5,355,455 A | * | 10/1994 | Hilgendorf et al. | 710/306 |
| 5,432,785 A | | 7/1995 | Ahmed et al. | |
| 5,680,402 A | * | 10/1997 | Olnowich et al. | 370/498 |
| 5,701,416 A | * | 12/1997 | Thorson | G06F 15/17381 340/2.1 |
| 5,764,740 A | | 6/1998 | Holender | |
| 5,859,981 A | * | 1/1999 | Levin et al. | 709/238 |
| 5,892,923 A | * | 4/1999 | Yasuda | G06F 15/17381 370/392 |
| 5,898,826 A | * | 4/1999 | Pierce | H04L 45/28 714/4.2 |
| 5,991,308 A | | 11/1999 | Fuhrmann et al. | |
| 6,003,029 A | | 12/1999 | Agrawal et al. | |
| 6,058,385 A | * | 5/2000 | Koza et al. | 706/13 |
| 6,101,181 A | * | 8/2000 | Passint et al. | 370/352 |
| 6,108,739 A | * | 8/2000 | James et al. | 710/113 |
| 6,249,902 B1 | | 6/2001 | Igusa et al. | |
| 6,314,487 B1 | * | 11/2001 | Hahn et al. | 710/317 |

(Continued)

FOREIGN PATENT DOCUMENTS

| | | |
|---|---|---|
| CN | 103684961 A | 3/2014 |
| WO | 2014059024 A1 | 4/2014 |

OTHER PUBLICATIONS

Abts, D., et al., Age-Based Packet Arbitration in Large-Radix k-ary n-cubes, Supercomputing 2007 (SC07), Nov. 10-16, 2007, 11 pgs.

(Continued)

*Primary Examiner* — Faisal M Zaman
(74) *Attorney, Agent, or Firm* — Procopio, Cory, Hargreaves & Savitch LLP

(57) ABSTRACT

Systems and methods for automatically building a deadlock free inter-communication network in a multi-core system are described. The example embodiments described herein involve deadlock detection during the mapping of user specified communication pattern amongst blocks of the system. Detected deadlocks are then avoided by re-allocation of channel resources. An example embodiment of the deadlock avoidance scheme is presented on Network-on-chip interconnects for large scale multi-core system-on-chips.

15 Claims, 10 Drawing Sheets

(56) References Cited

U.S. PATENT DOCUMENTS

| | | | |
|---|---|---|---|
| 6,415,282 B1 | 7/2002 | Mukherjea et al. | |
| 6,925,627 B1 | 8/2005 | Longway et al. | |
| 6,983,461 B2* | 1/2006 | Hutchison et al. | 718/104 |
| 7,065,730 B2 | 6/2006 | Alpert et al. | |
| 7,318,214 B1 | 1/2008 | Prasad et al. | |
| 7,590,959 B2 | 9/2009 | Tanaka | |
| 7,693,064 B2* | 4/2010 | Thubert et al. | 370/235 |
| 7,725,859 B1 | 5/2010 | Lenahan et al. | |
| 7,808,968 B1 | 10/2010 | Kalmanek, Jr. et al. | |
| 7,917,885 B2 | 3/2011 | Becker | |
| 8,050,256 B1 | 11/2011 | Bao et al. | |
| 8,059,551 B2 | 11/2011 | Milliken | |
| 8,099,757 B2 | 1/2012 | Riedle et al. | |
| 8,136,071 B2 | 3/2012 | Solomon | |
| 8,281,297 B2 | 10/2012 | Dasu et al. | |
| 8,312,402 B1 | 11/2012 | Okhmatovski et al. | |
| 8,448,102 B2 | 5/2013 | Kornachuk et al. | |
| 8,492,886 B2 | 7/2013 | Or-Bach et al. | |
| 8,541,819 B1 | 9/2013 | Or-Bach et al. | |
| 8,543,964 B2 | 9/2013 | Ge et al. | |
| 8,601,423 B1 | 12/2013 | Philip et al. | |
| 8,635,577 B2 | 1/2014 | Kazda et al. | |
| 8,667,439 B1 | 3/2014 | Kumar et al. | |
| 8,717,875 B2 | 5/2014 | Bejerano et al. | |
| 2002/0071392 A1 | 6/2002 | Grover et al. | |
| 2002/0073380 A1 | 6/2002 | Cooke et al. | |
| 2002/0095430 A1 | 7/2002 | Egilsson et al. | |
| 2003/0095557 A1* | 5/2003 | Keller | G06F 13/405 370/412 |
| 2003/0145314 A1* | 7/2003 | Nguyen et al. | 717/158 |
| 2004/0049565 A1* | 3/2004 | Keller et al. | 709/223 |
| 2004/0216072 A1 | 10/2004 | Alpert et al. | |
| 2004/0257993 A1* | 12/2004 | Lysne et al. | 370/230 |
| 2005/0147081 A1 | 7/2005 | Acharya et al. | |
| 2005/0201356 A1* | 9/2005 | Miura | H04L 45/00 370/351 |
| 2006/0075169 A1* | 4/2006 | Harris et al. | 710/110 |
| 2006/0161875 A1 | 7/2006 | Rhee | |
| 2007/0038987 A1* | 2/2007 | Ohara et al. | 717/151 |
| 2007/0118320 A1 | 5/2007 | Luo et al. | |
| 2007/0162903 A1* | 7/2007 | Babb et al. | 717/154 |
| 2007/0244676 A1 | 10/2007 | Shang et al. | |
| 2007/0256044 A1 | 11/2007 | Coryer et al. | |
| 2007/0267680 A1 | 11/2007 | Uchino et al. | |
| 2008/0072182 A1 | 3/2008 | He et al. | |
| 2008/0120129 A1 | 5/2008 | Seubert et al. | |
| 2008/0184259 A1* | 7/2008 | Lesartre et al. | 719/312 |
| 2008/0285458 A1* | 11/2008 | Lysne | 370/238 |
| 2009/0046727 A1* | 2/2009 | Towles | 370/397 |
| 2009/0070726 A1 | 3/2009 | Mehrotra et al. | |
| 2009/0268677 A1 | 10/2009 | Chou et al. | |
| 2009/0313592 A1 | 12/2009 | Murali et al. | |
| 2010/0040162 A1 | 2/2010 | Suehiro | |
| 2011/0035523 A1 | 2/2011 | Feero et al. | |
| 2011/0060831 A1 | 3/2011 | Ishii et al. | |
| 2011/0072407 A1 | 3/2011 | Keinert et al. | |
| 2011/0154282 A1 | 6/2011 | Chang et al. | |
| 2011/0276937 A1 | 11/2011 | Waller | |
| 2012/0022841 A1 | 1/2012 | Appleyard | |
| 2012/0023473 A1 | 1/2012 | Brown et al. | |
| 2012/0026917 A1 | 2/2012 | Guo et al. | |
| 2012/0110541 A1 | 5/2012 | Ge et al. | |
| 2012/0155250 A1 | 6/2012 | Carney et al. | |
| 2013/0051397 A1 | 2/2013 | Guo et al. | |
| 2013/0080073 A1 | 3/2013 | de Corral | |
| 2013/0103369 A1 | 4/2013 | Huynh et al. | |
| 2013/0151215 A1 | 6/2013 | Mustapha | |
| 2013/0159944 A1 | 6/2013 | Uno et al. | |
| 2013/0174113 A1 | 7/2013 | Lecler et al. | |
| 2013/0207801 A1 | 8/2013 | Barnes | |
| 2013/0219148 A1 | 8/2013 | Chen et al. | |
| 2013/0263068 A1 | 10/2013 | Cho et al. | |
| 2013/0308444 A1* | 11/2013 | Sem-Jacobsen et al. | 370/230 |
| 2013/0326458 A1 | 12/2013 | Kazda et al. | |
| 2014/0092740 A1 | 4/2014 | Wang et al. | |
| 2014/0098683 A1 | 4/2014 | Kumar et al. | |
| 2014/0115218 A1 | 4/2014 | Philip et al. | |
| 2014/0115298 A1 | 4/2014 | Philip et al. | |

OTHER PUBLICATIONS

Das, R., et al., Aergia: Exploiting Packet Latency Slack in On-Chip Networks, 37th International Symposium on Computer Architecture (ISCA '10), Jun. 19-23, 2010, 11 pgs.

Ebrahimi, E., et al., Fairness via Source Throttling: A Configurable and High-Performance Fairness Substrate for Multi-Core Memory Systems, ASPLOS '10, Mar. 13-17, 2010, 12 pgs.

Grot, B., Preemptive Virtual Clock: A Flexible, Efficient, and Cost-Effective QOS Scheme for Networks-on-Chip, Micro '09, Dec. 12-16, 2009, 12 pgs.

Grot, B., Kilo-NOC: A Heterogeneous Network-on-Chip Architecture for Scalability and Service Guarantees, ISCA '11, Jun. 4-8, 2011, 12 pgs.

Grot, B., Topology-Aware Quality-of-Service Support in Highly Integrated Chip Multiprocessors, 6th Annual Workshop on the Interaction between Operating Systems and Computer Architecture, Jun. 2006, 11 pgs.

Jiang, N., et al., Performance Implications of Age-Based Allocations in On-Chip Networks, CVA MEMO 129, May 24, 2011, 21 pgs.

Lee, J. W., et al., Globally-Synchronized Frames for Guaranteed Quality-of-Service in On-Chip Networks, 35th IEEE/ACM International Symposium on Computer Architecture (ISCA), Jun. 2008, 12 pgs.

Lee, M. M., et al., Approximating Age-Based Arbitration in On-Chip Networks, PACT '10, Sep. 11-15, 2010, 2 pgs.

Li, B., et al., CoQoS: Coordinating QoS-Aware Shared Resources in NoC-based SoCs, J. Parallel Distrib. Comput., 71 (5), May 2011, 14 pgs.

International Search Report and Written Opinion for PCT/US2013/064140, Jan. 22, 2014, 9 pgs.

International Search Report and Written Opinion for PCT/US2014/012003, Mar. 26, 2014, 9 pgs.

International Search Report and Written Opinion for PCT/US2014/012012, May 14, 2014, 9 pgs.

Ababei, C., et al., Achieving Network on Chip Fault Tolerance by Adaptive Remapping, Parallel & Distributed Processing, 2009, IEEE International Symposium, 4 pgs.

Beretta, I, et al., A Mapping Flow for Dynamically Reconfigurable Multi-Core System-on-Chip Design, IEEE Transactions on Computer-Aided Design of Integrated Circuits and Systems, Aug. 2011, 30(8), pp. 1211-1224.

Gindin, R., et al., NoC-Based FPGA: Architecture and Routing, Proceedings of the First International Symposium on Networks-on-Chip (NOCS'07), May 2007, pp. 253-262.

Yang, J., et al., Homogeneous NoC-based FPGA: The Foundation for Virtual FPGA, 10th IEEE International Conference on Computer and Information Technology (CIT 2010), Jun. 2010, pp. 62-67.

* cited by examiner

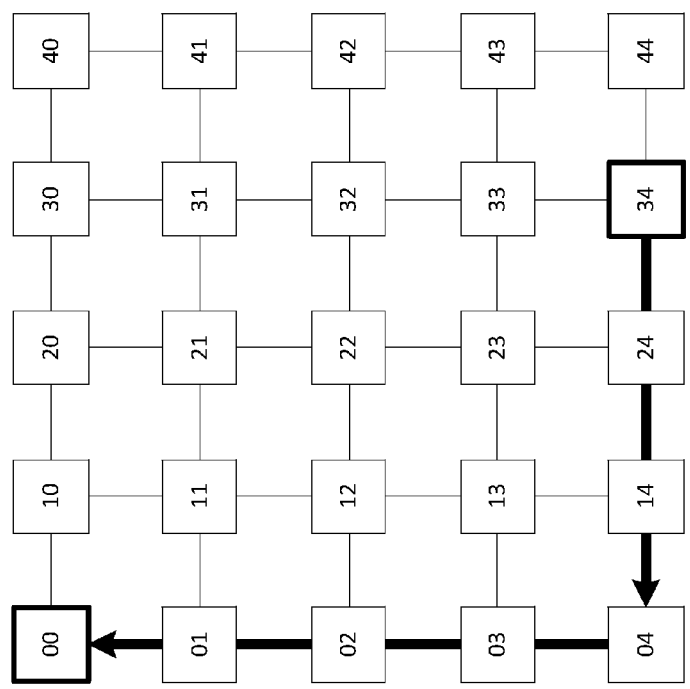

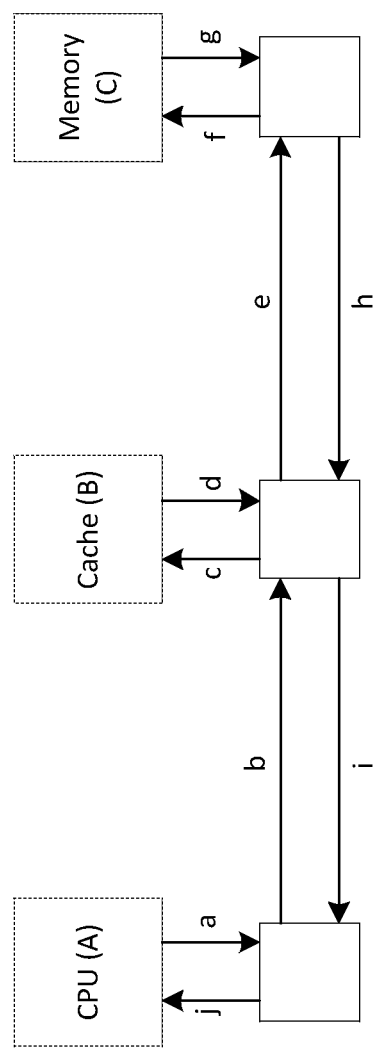
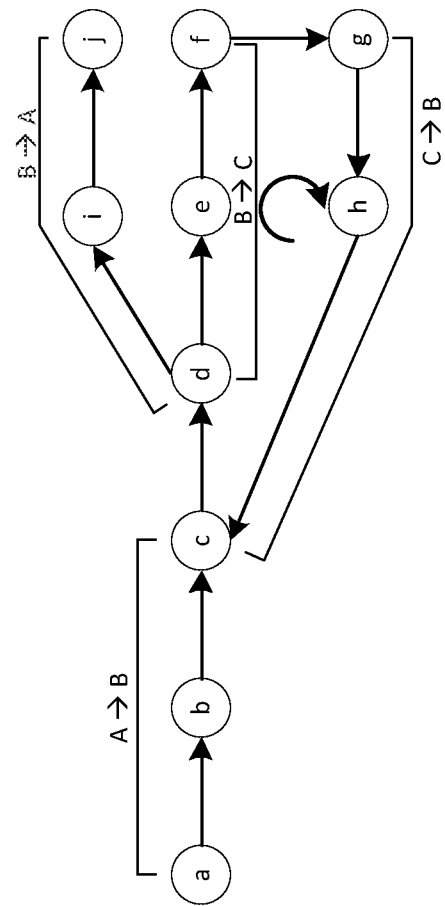
FIG. 7(a)
FIG. 7(b)

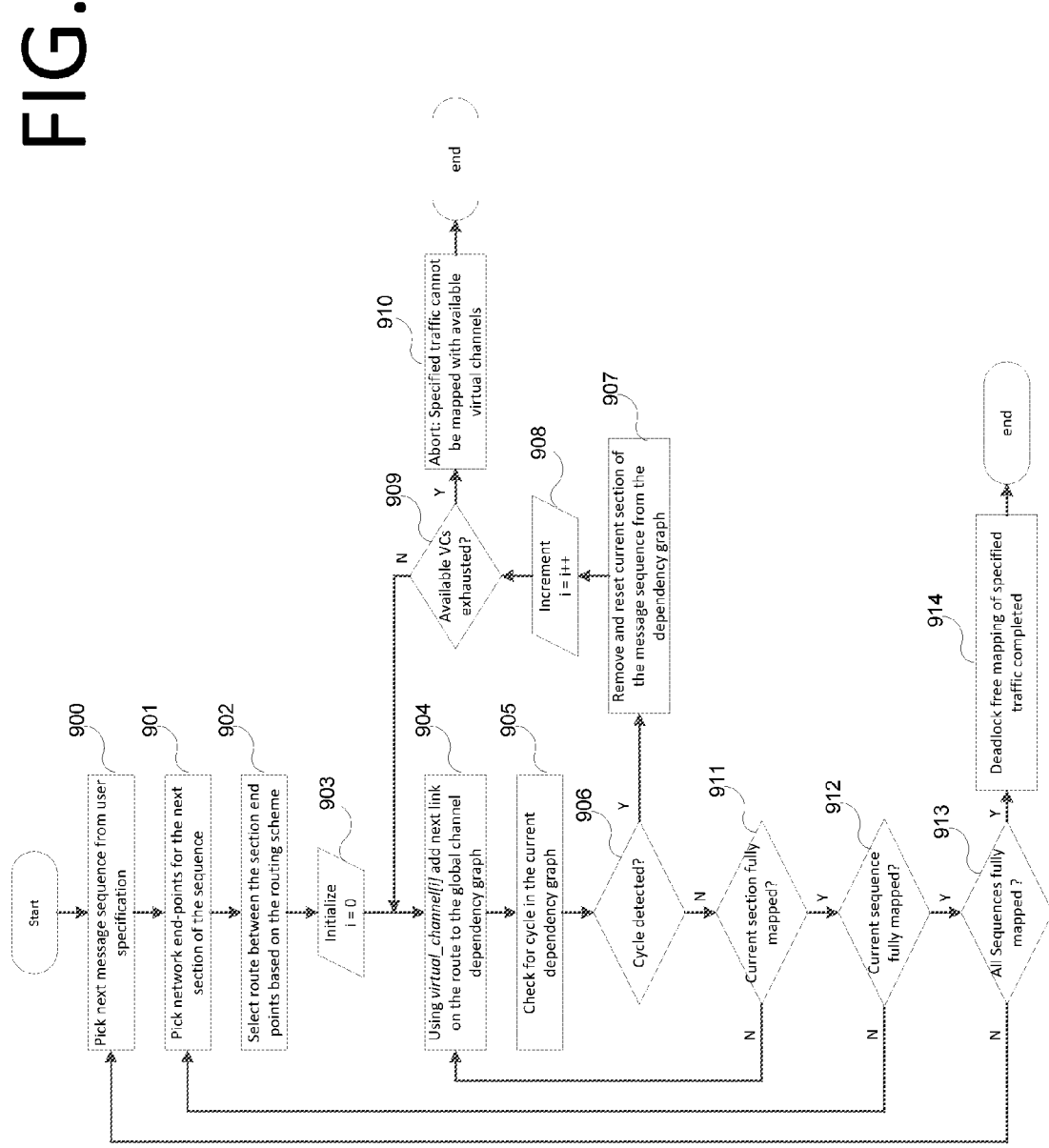

AUTOMATIC CONSTRUCTION OF DEADLOCK FREE INTERCONNECTS

BACKGROUND

1. Technical Field

Methods and example embodiments described herein are generally directed to interconnect architecture, and more specifically, to network on chip system interconnect architecture.

2. Related Art

The number of components on a chip is rapidly growing due to increasing levels of integration, system complexity and shrinking transistor geometry. Complex System-on-Chips (SoCs) may involve a variety of components e.g., processor cores, DSPs, hardware accelerators, memory and I/O, while Chip Multi-Processors (CMPs) may involve a large number of homogenous processor cores, memory and I/O subsystems. In both systems the on-chip interconnect plays a key role in providing high-performance communication between the various components. Due to scalability limitations of traditional buses and crossbar based interconnects, Network-on-Chip (NoC) has emerged as a paradigm to interconnect a large number of components on the chip. NoC is a global shared communication infrastructure made up of several routing nodes interconnected with each other using point-to-point physical links. Messages are injected by the source and are routed from the source router to the destination over multiple intermediate routers and physical links. The destination router then ejects the message and provides it to the destination. For the remainder of the document, terms 'components', 'blocks' or 'cores' will be used interchangeably to refer to the various system components which are interconnected using a NoC. Without loss of generality, the system with multiple interconnected components will itself be referred to as 'multi-core system'.

There are several possible topologies in which the routers can connect to one another to create the system network. Bi-directional rings (as shown in FIG. 1(a)) and 2-D mesh (as shown in FIG. 1(b)) are examples of topologies in the related art.

Packets are message transport units for intercommunication between various components. Routing involves identifying a path which is a set of routers and physical links of the network over which packets are sent from a source to a destination. Components are connected to one or multiple ports of one or multiple routers; with each such port having a unique ID. Packets carry the destination's router and port ID for use by the intermediate routers to route the packet to the destination component.

Examples of routing techniques include deterministic routing, which involves choosing the same path from A to B for every packet. This form of routing is independent of the state of the network and does not load balance across path diversities which might exist in the underlying network. However, deterministic routing is simple to implement in hardware, maintains packet ordering and easy to make free of network level deadlocks. Shortest path routing minimizes the latency as it reduces the number of hops from the source to destination. For this reason, the shortest path is also the lowest power path for communication between the two components. Dimension-order routing is a form of deterministic shortest path routing in 2D mesh networks.

FIG. 2 illustrates an example of XY routing in a two dimensional mesh. More specifically, FIG. 2 illustrates XY routing from node '34' to node '00'. In the example of FIG. 2, each component is connected to only one port of one router. A packet is first routed in the X dimension till it reaches node '04' where the x dimension is same as destination. The packet is next routed in the Y dimension until it reaches the destination.

Source routing and routing using tables are other routing options used in NoC. Adaptive routing can dynamically change the path taken between two points on the network based on the state of the network. This form of routing may be complex to analyze and implement and is therefore rarely used in practice.

Software applications running on large multi-core systems can generate complex inter-communication messages between the various blocks. Such complex, concurrent, multi-hop communication between the blocks can result in deadlock situations on the interconnect. Deadlock occurs in a network when messages are unable to make progress to their destination because they are waiting on one another to free up resources (e.g. at buffers and channels). Deadlocks due to blocked buffers can quickly spread over the entire network, which may paralyze further operation of the system. Deadlocks can broadly be classified into network level deadlocks and protocol level deadlocks.

Deadlock is possible within a network if there are cyclic dependencies between the channels in the network. FIG. 3 illustrates an example of network level deadlock. In the example of FIG. 3, starting at a state with all buffers empty, the blocks initiate the message transfer of A→C, B→D, C→A and D→B simultaneously. Each block takes hold of its outgoing channel and transmits the message toward its destination. In the example of FIG. 3, each channel can hold only one message at a time. From this point on, each channel waits on the next channel to move the message further. There is a cyclic dependency in the wait graph and the network becomes deadlocked. Such network layer deadlock or low-level deadlocks can be avoided by construction using deadlock free routing or virtualization of paths.

Network end points may not be ideal sinks, i.e. they may not consume all incoming packets until some of the currently outstanding packets are processed. If a new packet needs to be transmitted during the processing of an outstanding packet, a dependency may be created between the NoC ejection and injection channels of the module. The dependency may become cyclic based upon the message sequence, position of components and routes taken by various messages. If the deadlock is caused by dependencies external to the network layer, this is called a high-level, protocol or an application level deadlock. In related art systems, most high level tasks involve a message flow between multiple modules on the NoC in a specific sequence. Such a multi-point sequence of intercommunication may introduce complex dependencies resulting in protocol level deadlock. The underlying cause of deadlock remains the channel dependency cycle introduced by the inter-dependent messages between multiple components. Independent messages from one end point to another on the network will not cause protocol level deadlocks; however, depending on the routing of such messages on the network, network level deadlocks are still possible in the system.

FIGS. 4(a), 4(b) and FIGS. 5(a) to 5(c) illustrate an example of protocol level deadlock. Consider an example of a three central processing unit (CPU) system connected to memory and cache controller through a crossbar. The cache controller's interface to the interconnect has a single First-In-First-Out (FIFO) buffer which can hold a maximum of three messages. Internally, the cache controller can process up to two requests simultaneously (and therefore process up to two outstanding miss requests to the memory).

At FIG. 4(a), all three CPUs send read requests to the cache controller.

At FIG. 4(b), read requests are queued in an input buffer to the cache controller from the crossbar.

At FIG. 5(a), the cache controller accepts two requests '1' and '2' from input buffer while the third request '3' remains in the input buffer. '1' and '2' have a read miss in the cache, which in turn issues miss refill requests 'm1', 'm2' to the memory At FIG. 5(b), the memory returns refill data 'd1', 'd2'. This data gets queued behind '3' in the cache controller's input buffer.

At FIG. 5(c), the cache controller waits for refill data for the outstanding requests before accepting new request '3'. However the refill data is blocked behind this request '3'. The system is therefore deadlocked.

In this system, deadlock avoidance can be achieved by provisioning additional buffer space in the system, or using multiple physical or virtual networks for different message types. In general, deadlock is avoided by manually 1) interpreting the intercommunication message sequence and dependencies, 2) then allocating sufficient buffers and virtual and/or physical channels and 3) assigning various messages in the sequence the appropriate channel.

In large networks such as the internet, deadlocks are of a lesser concern. Mechanisms such as congestion detection, timeouts, packet drops, acknowledgment and retransmission provide deadlock resolution. However such complex mechanisms are too expensive in terms of power, area and speed to implement on interconnection networks where the primary demands are low latency and high performance. In such systems, deadlock avoidance becomes a critical architectural requirement.

SUMMARY

This invention proposes automatic construction of a system interconnect which is free from both network and application level deadlock, based upon the provided specification of intercommunication message pattern amongst various components of the system. An exemplary implementation of the process is also disclosed, wherein deadlock avoidance is achieved while keeping the interconnect resource cost minimal.

BRIEF DESCRIPTION OF THE DRAWINGS

FIG. 2 illustrates an example of XY routing in a two dimensional mesh.

FIGS. 7(a) and 7(b) illustrate an example of deadlock in the memory subsystem.

FIG. 9 illustrates a flowchart for deadlock free traffic mapping on a NoC, in accordance with an example embodiment.

DETAILED DESCRIPTION

Figure 1B:
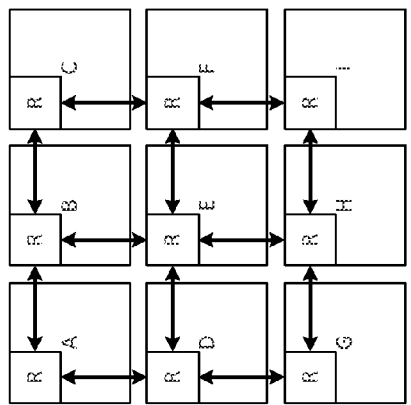
FIGS. 1(a) and 1(b) illustrate Bidirectional ring and 2D Mesh NoC Topologies
Figure 1A:
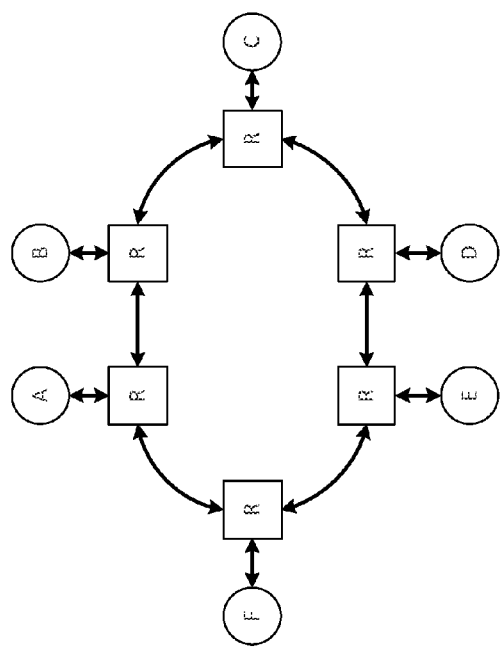
Figure 3:
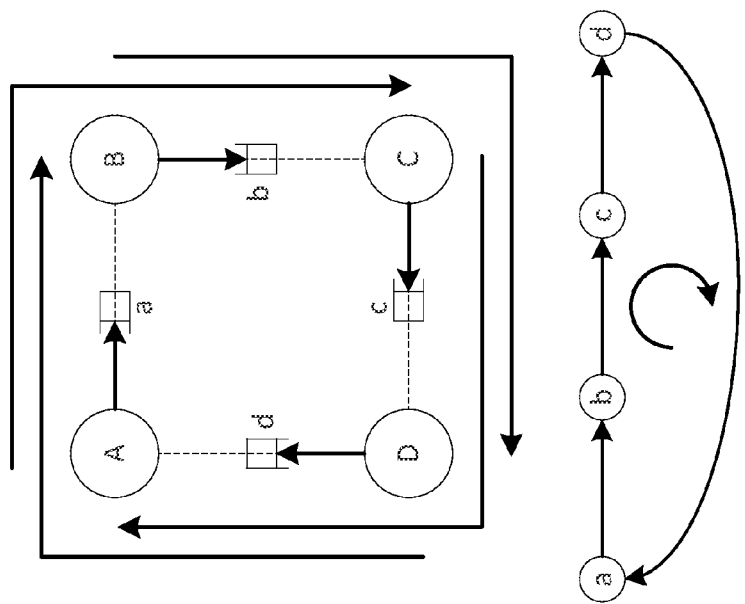
FIG. 3 illustrates an example of network level deadlock.
Figures 4A, 4B:
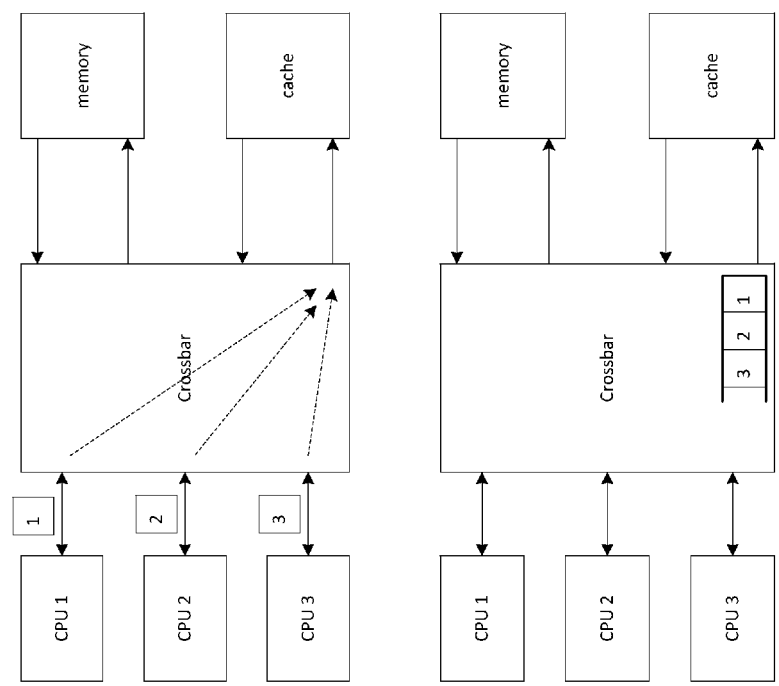
FIGS. 4(a), 4(b) illustrate an example memory subsystem with three CPUs issuing read requests to cache controller.
Figure 5A:
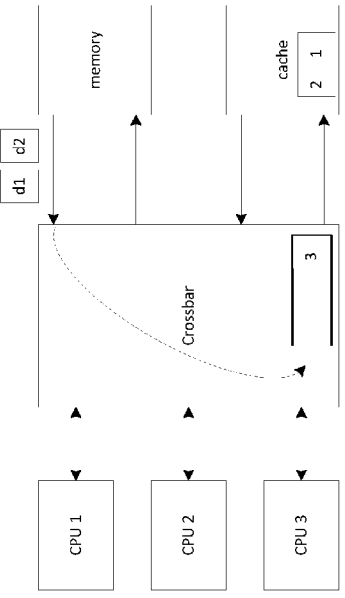
FIGS. 5(a) to 5(c) illustrate message exchange in the memory subsystem causing protocol level deadlock.
Figure 5B:
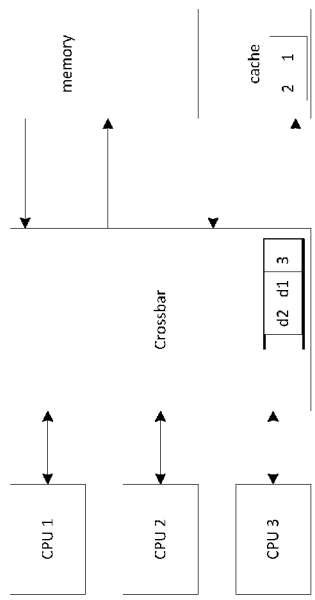
Figure 5C:
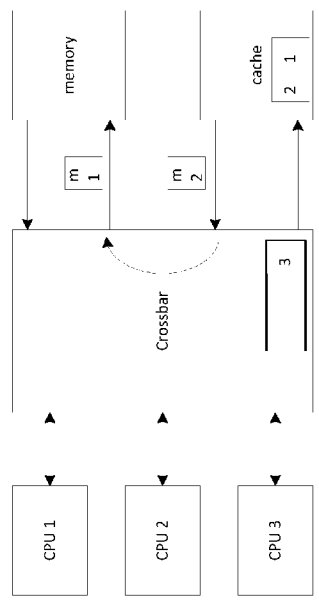

Complex dependencies introduced by applications running on large multi-core systems can be difficult to analyze manually to ensure deadlock free operation. Example embodiments described herein are based on the concept of automatically constructing deadlock free interconnect for a specified inter-block communication pattern in the system. An example process of the automatic deadlock free interconnect construction is also disclosed.

Applications running on multi-core systems often generate several sequences of inter-dependent messages between multiple blocks, wherein a message arriving at a block must generate another message for a different block, before it completes processing and releases the resources at the block for new messages. For a hypothetical example, consider a task running on block A which requests an operation to be performed on block B. On receiving the request message, block B completes part of the operation and sends partial results to a third block C which performs another part of the operation and sends the partial results to block D. Block D performs consolidation and sends the final results back to block A. Completion of the operation on block A required a sequence of messages to be generated and exchanged between multiple blocks on the network. There are higher level dependencies between the messages for successful completion of task on the originating block. At the network interface of intermediate blocks there is a dependency of the incoming channel on the outgoing channel of the block. Any cycles in such channel dependencies can result in protocol level deadlock in the system.

Traditional systems may employ semi-automatic analysis for detecting potential deadlocks in multi-core systems, however the results are manually analyzed and suitable modifications to the interconnect are made to avoid potential deadlocks.

Communications in the system are specified in its entirety to capture all high level message dependencies. Example embodiments then takes a holistic view of messages on the interconnect, allocates channel resources, and assigns messages to the allocated channel resources to ensure that the generated interconnect is deadlock free at both network and protocol level. The example embodiments remove cyclic resource dependencies in the communication graph through the use of virtual channels. Virtual channels provide logical links over the physical channels connecting two ports. Each virtual channel has an independently allocated and flow controlled flit buffer in the network nodes. Each high level communication in the system needs to be specified in the form of grouped end-to-end sequence of multiple blocks between which the message flows. In the hypothetical example presented above, the sequence would be represented as A→B→C→D→A. Routing paths on the network, between each source-destination pair i.e. sections making up the above sequence, are either made available to the algorithm used in example embodiments, or the algorithm automatically determines to avoid deadlock.

The flow of the example embodiments begins with the most complex message sequence and uses its routed path on the network to create a channel dependency graph. The example embodiments use the lowest virtual channel ID on the physical links and then pick up progressively less complex message sequences and continue to map their route to the existing global channel dependency graph. When mapping a path between two blocks, if a cycle is detected in the dependency graph, the example embodiments backtrack and re-map the section that contains the dependency by using the next highest virtual channel ID on the path to remove the cycle from the dependency graph. As a rule, example embodiments first attempt to map on to any pre-allocated virtual channels in increasing order of channel ID value and if no other pre-allocated virtual channels remain on the path, allocate free virtual channel IDs also in increasing order of channel ID value. This process continues till network routes of all the specified message sequences are mapped on the global graph without any cycles. The algorithm aborts the effort if a deadlock free mapping of the specified system messages cannot be achieved with the constraint on the number of available virtual channels. Further details are provided in the examples below and in the flowchart of FIG. 9. Other variations of the scheme are possible. For example, instead of using the same virtual channel for all physical links of a route between end points of a section of a message sequence, it is possible to use different virtual channels on each physical link of a route. It is also possible for the algorithm to attempt to use different routes for various messages in order to reduce the virtual channels usage, or for load balancing while maintaining deadlock avoidance.

In an example system, the CPU communicates with a memory subsystem that includes a cache and external DRAM memory. The CPU issues a read request which has a read miss in the cache. As a result, the cache controller issues a read refill request to the external memory controller. Refill data returns from the memory to cache controller which in turn issues read response to the CPU.

Figure 6:
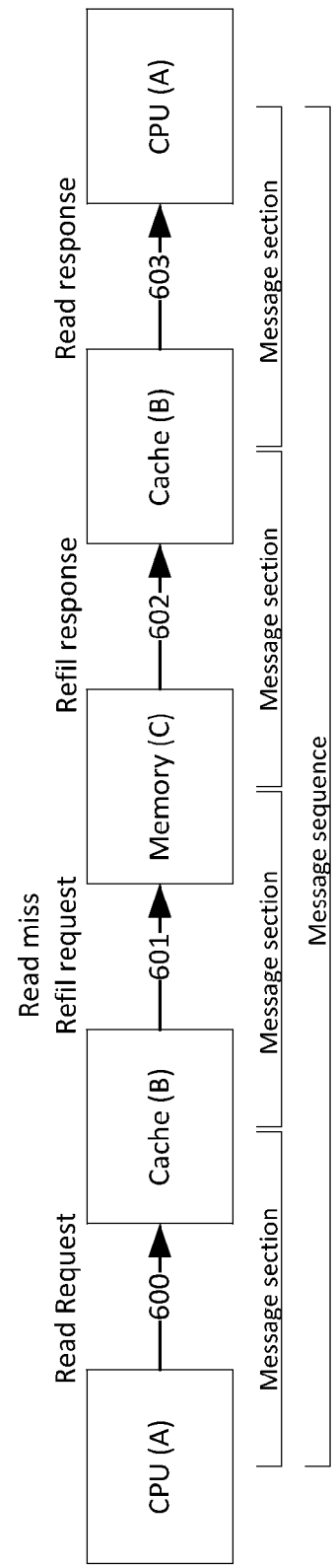
FIG. 6 illustrates an example of communication sequence on a cache read miss in a memory subsystem.

FIG. 6 illustrates an example of communication sequence on a cache read miss. The example communication pattern described above is expressed as a sequence as shown in FIG. 6. In the cache read miss sequence example, a read request 600 is sent from CPU (A) to Cache (B). At Cache (B), a cache read miss occurs and a read refill request 601 is generated which proceeds to Memory (C). At Memory (C), read refill response 602 is generated and sent back to Cache (B). Cache (B) then sends read response 603 back to CPU (A).

FIGS. 7(a) and 7(b) illustrate an example of deadlock in the memory subsystem. Specifically, FIG. 7(a) shows a simple topology in which the CPU, cache and memory are interconnected by physical links. Each physical link on the network is assumed to have a single virtual channel. FIG. 7(b) illustrates a possible channel dependency graph for the above communication sequence. Specifically, the communication sequence on a cache read miss as depicted in FIG. 6 are illustrated in FIG. 7(b) based on the physical links of FIG. 7(a). The graph has a cycle indicating potential application level deadlock. For example, deadlock may occur when CPU (A) sends a subsequent read request message to Cache (B) by physical channel c before Cache (B) receives a response from Memory (C), through the same physical channel for the earlier refill request. Cache (B) thereby becomes deadlocked as it cannot process the subsequent read request message from CPU (A) without first processing its pending refill request, and cannot process the pending refill request as the response to the refill request from Memory (C) is in the queue for physical channel c, behind the subsequent read request message. Similarly, deadlock may occur when Cache (B) attempts to return a response to the message from CPU (A) through physical channel d, but cannot send the message through the channel if Memory (C) has not processed previous messages sent from Cache (B) to Memory (C).

Figure 8A:
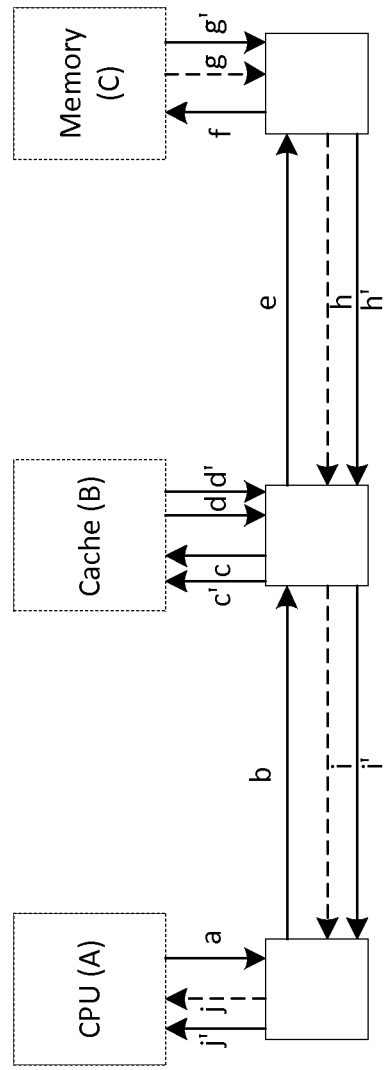
FIGS. 8(a) and 8(b) illustrates an example of an implementation of automatic deadlock avoidance in the memory subsystem, in accordance with an example embodiment.
Figure 8B:
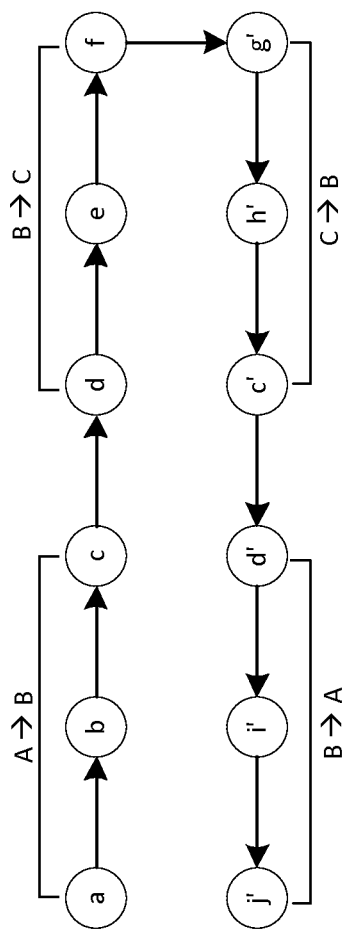

FIGS. 8(a) and 8(b) illustrates automatic deadlock avoidance implemented in the example system of FIG. 6, in accordance with an example embodiment. As shown in FIG. 8(a), virtual channel ID 0 is utilized on communication sections A→B and B→C without seeing any deadlocks. However, when the subsystem tries to map section C→B on VC ID 0, a loop is detected (e.g., at physical channel c due to the deadlock as described in FIG. 7(b)). The subsystem back tracks and tires to remap C→B path using VC ID 1 (leaving VC ID 0 unused), which does not cause any cycles in the graph. The subsystem proceeds to map path B→A starting with VC ID 0, which creates a cycle in the graph (e.g., at physical channel d due to the deadlock as described in FIG. 7(b)). The subsystem then tries VC ID 1 which maps successfully without cycles in the graph. Thus the subsystem has successfully mapped the entire communication sequence while avoiding potential deadlocks.

FIG. 9 illustrates a flowchart for deadlock free traffic mapping on a NoC, in accordance with an example embodiment. In the implementation as depicted in FIG. 9, at 900, the system selects a user specified message sequence (e.g., receiving a message sequence from the user). At 901, the system selects network end-points to define a section of the sequence. At 902, the system selects a route between the section end points based on a routing scheme. At 903, an internal counter may be set from zero to count how many of the available virtual channels are tested to map the specified traffic. At 904, the system utilizes the next available virtual channel as indicated by the counter to add a link on the route to the global channel dependency graph. At 905, the system checks (e.g. automatically) for a cyclic dependency in the current dependency graph. At 906, if a cycle is detected, then the system proceeds to 907 to remove and reset the current section of the message sequence from the dependency graph. The system proceeds then to 908 to increment the counter to the next available virtual channel, and determines at 909 if all of the available virtual channels have been exhausted. The system proceeds back to 904 if the available virtual channels have not been exhausted. However, if all available virtual channels have been attempted, then the system proceeds to 910 to end the process and to indicate (e.g. message to user) that the specified traffic cannot be mapped with the available virtual channels.

If no cycle is detected, then the system proceeds to 911 to determine if the current section is fully mapped. If the current section is not fully mapped, then the system proceeds to 904 to utilize the virtual channel (as indicated by the counter) to add the next link on the route.

If the current section is fully mapped, then the system proceeds to 912 to determine if the current sequence has been fully mapped. If the current sequence has not been fully mapped, then the system proceeds to 901 to select end-points for the next section of the sequence.

If the current sequence has been fully mapped, then the system proceeds to 913 to determine if all sequences have been fully mapped. If all sequences have not been fully mapped then the system proceeds to 900 to use the next message sequence from the user specification. If all sequences have been fully mapped, the system proceeds to 914 to indicate (e.g., message to the user) a possible deadlock free mapping of the specified traffic.

Figure 10:
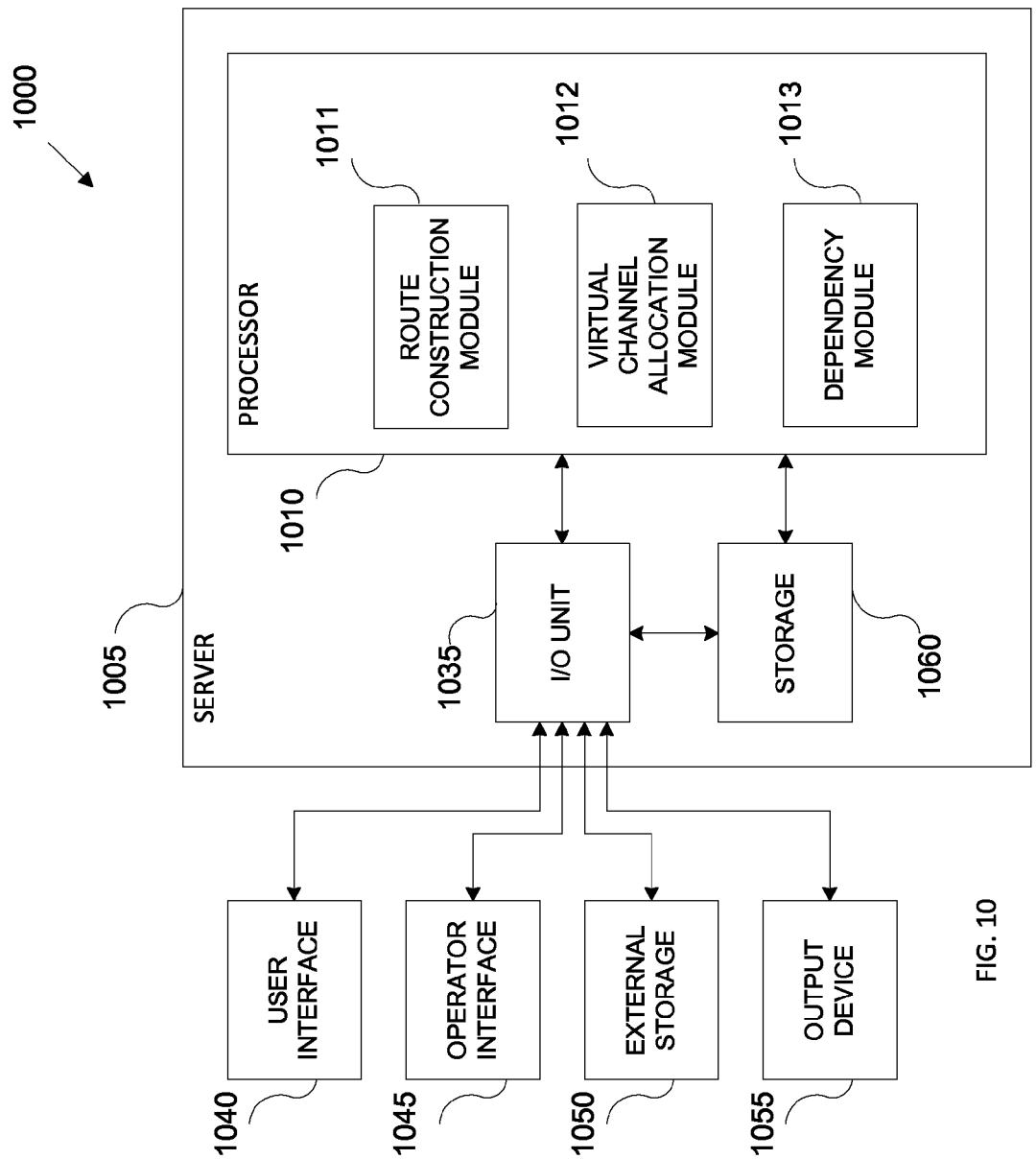
FIG. 10 illustrates an example computer system on which example embodiments may be implemented.

FIG. 10 illustrates an example computer system 1000 on which example embodiments may be implemented. The computer system 1000 includes a server 1005 which may involve an I/O unit 1035, storage 1060, and a processor 1010 operable to execute one or more units as known to one of skill in the art. The term "computer-readable medium" as used herein refers to any medium that participates in providing instructions to processor 1010 for execution, which may come in the form of computer-readable storage mediums, such as, but not limited to optical disks, magnetic disks, read-only memories, random access memories, solid state devices and drives, or any other types of tangible media suitable for storing electronic information, or computer-readable signal mediums, which can include transitory media such as carrier waves. The I/O unit processes input from user interfaces 1040 and operator interfaces 1045 which may utilize input devices such as a keyboard, mouse, touch device, or verbal command.

The server 1005 may also be connected to an external storage 1050, which can contain removable storage such as a portable hard drive, optical media (CD or DVD), disk media or any other medium from which a computer can read executable code. The server may also be connected an output device 1055, such as a display to output data and other information to a user, as well as request additional information from a user. The connections from the server 1005 to the user interface 1040, the operator interface 1045, the external storage 1050, and the output device 1055 may via wireless protocols, such as the 802.11 standards, Bluetooth® or cellular protocols, or via physical transmission media, such as cables or fiber optics. The output device 1055 may therefore further act as an input device for interacting with a user.

The processor 1010 may execute one or more modules. The route construction module 1011 is configured to automatically construct a path comprising of physical links of the interconnect for routing messages from a source block to a destination block in the multi-core system. The virtual channel allocation module 1012 may be configured to allocate one of the available virtual channels for a link in the route between endpoints of a section in a message sequence of the multi-core system and add it to the global channel dependency graph. The dependencies module 1013 may be configured to automatically check for cyclic dependencies among the channels by detecting loops in the channel dependency graph.

The route construction module 1011, the virtual channel allocation module 1012, and the dependencies module 1013 may interact with each other in various ways depending on the desired implementation. For example, the route construction module 1011 may select network end-points to define a section of a sequence, and select a route between the section end points based on a routing scheme, based on load balancing, based on resource minimization or other possible factors. The virtual channel allocation module 1012 may set an internal counter may be set from zero to count how many of the available virtual channels are tested to map the specified traffic. The virtual channel allocation module may allocate virtual channels based on resource sharing and minimization, load balancing or other possible factors.

The route construction module 1011 may instruct the virtual channel allocation module 1012 to utilize the next available virtual channel (e.g. as indicated by the counter in the virtual channel allocation module) to add a link on the route to the global channel dependency graph. Then, the route construction module 1011 may instruct the dependency module 1013 to checks (e.g. automatically) for a cyclic dependency in the current dependency graph. If the dependency module 1013 detects a dependency, the route construction module 1011 may remove and reset the current section of the message sequence from the dependency graph, wherein the virtual channel allocation module 1012 may increment the counter to the next available virtual channel, and check if the available virtual channels are exhausted. If all available virtual channels have been attempted, then the route construction module 1011 may abort and indicate (e.g. message to user) that the specified traffic cannot be mapped with the available virtual channels.

If no cycle is detected by the dependency module 1013, then the route construction module 1011 may determine if the current section is fully mapped. If the current section is determined not to be fully mapped, then the route construction module 1011 attempts to utilize the allocated virtual channel to add the next link on the route, and to recheck the dependency.

If the current section is determined to be fully mapped, then the route construction module 1011 may determine if the current sequence has been fully mapped. If the current sequence is determined not to be fully mapped, then the route construction module 1011 may proceed to select end-points for the next section of the sequence and attempt to select another route between the new end points based on a routing scheme.

If the current sequence is determined to be fully mapped, then the route construction module determines if all sequences have been fully mapped. If all sequences are determined not to be fully mapped, then the route construction module 1011 selects the next message sequence from the user specification and attempts to map the next message sequence. If all sequences are determined to be fully mapped, then the route construction module 1011 may indicate (e.g., message to the user) a possible deadlock free mapping of the specified traffic.

The route construction module may also conduct the automatic construction of a map by being configured to receive a specification of the multi-core system containing a deadlock; to instruct the allocation module 1012 to automatically reallocate virtual channels until the deadlock is resolved; and to construct the map based on the reallocation.

Furthermore, some portions of the detailed description are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the example embodiments, the steps carried out require physical manipulations of tangible quantities for achieving a tangible result.

Moreover, other implementations of the example embodiments will be apparent to those skilled in the art from consideration of the specification and practice of the example embodiments disclosed herein. Various aspects and/or components of the described example embodiments may be used singly or in any combination. It is intended that the specification and examples be considered as examples, with a true scope and spirit of the embodiments being indicated by the following claims.

What is claimed is:

1. A computer implemented method, comprising:
   automatically constructing a map of interconnected channels for a Network on Chip (NoC) system such that the NoC system is free of deadlock, based on channels of the NoC system, by
      determining the channels of the NoC system from a specification of the NoC system, wherein the specification contains a deadlock;
      allocating one of the channels for a link in a route between endpoints of a section of message sequence of the NoC system in a dependency graph;
      automatically checking for cyclic dependencies in the dependency graph;
      automatically reallocating the channels of the specification of the NoC system until the deadlock is resolved, wherein the automatically reallocating the channels comprises adding one or more additional virtual channels; and
      constructing the map of interconnected channels based on the reallocation.

2. The method of claim 1, further comprising, when no cyclic dependencies are detected:

including the allocation of the one of the channels for the link in the automatic construction of the map;

utilizing the allocated one of the channels or a newly allocated channel for another link in the route in the dependency graph, if the route is not completely mapped; and automatically checking for cyclic dependencies in the dependency graph, if the route is not completely mapped.

3. The method of claim 1, further comprising, when cyclic dependencies are detected:

discarding the allocated one from the dependency graph, and allocating another one of the available channels for the route in the dependency graph.

4. The method of claim 1, wherein the allocating and the checking for cyclic dependencies is repeated until the sequence is completely mapped or until the channels are all exhausted.

5. A non-transitory computer readable storage medium storing instructions for implementing a method, the instructions comprising:

automatically constructing a map of interconnected channels for a Network on Chip (NoC) system such that the multi-core system is free of deadlock, based on channels of the NoC system, by
  determining the channels of the NoC system from a specification of the NoC system, wherein the specification contains a deadlock;
  allocating one of the channels for a link in a route between endpoints of a sequence of the NoC system in a dependency graph;
  automatically checking for cyclic dependencies in the dependency graph;
  automatically reallocating the channels of the specification of the NoC system until the deadlock is resolved, wherein the automatically reallocating the channels comprises adding one or more additional virtual channels; and
  constructing the map of interconnected channels based on the reallocation.

6. The non-transitory computer readable storage medium of claim 5, wherein the instructions further comprise, when no cyclic dependencies are detected:

including the allocation of the one of the channels for the link in the automatic construction of the map;

utilizing the allocated one of the channels or a newly allocated channel for another link in the route in the dependency graph, if the route is not completely mapped;

automatically checking for cyclic dependencies in the dependency graph, if the route is not completely mapped.

7. The non-transitory computer readable storage medium of claim 5, wherein the instructions further comprise, when cyclic dependencies are detected:

discarding the allocated one from the dependency graph, and allocating another one of the available channels for the route in the dependency graph.

8. The non-transitory computer readable storage medium of claim 5, wherein the allocating and the checking for cyclic dependencies is repeated until the sequence is completely mapped or until the channels are all exhausted.

9. A system, comprising:

a route construction module configured to:
  automatically construct a map of interconnected channels for a Network on Chip (NoC) system such that the NoC system is free of deadlock, based on channels of the NoC system;
  determine the channels of the NoC system from a specification of the NoC system, wherein the specification contains a deadlock;
  automatically utilizing the allocation module to reallocate the channels of the specification of the NoC system until the deadlock is resolved, wherein the automatically reallocating the channels comprises adding one or more additional virtual channels; and
  construct the map of interconnected channels based on the reallocation;

an allocation module configured to allocate one of the channels for a link in a route between endpoints of a sequence of the multi-core system in a dependency graph; and a dependencies module configured to automatically check for cyclic dependencies in the dependency graph.

10. The system of claim 9, wherein when no cyclic dependencies are detected by the dependencies module, the route construction module is configured to:

include the allocation of the one of the channels for the link in the automatic construction of the map;

instruct the allocation module to utilize the allocated one of the channels or a newly allocated channel for another link in the route in the dependency graph, if the route is not completely mapped; and instruct the dependencies module to automatically check for cyclic dependencies in the dependency graph, if the route is not completely mapped.

11. The system of claim 9, wherein when cyclic dependencies are detected by the dependencies module, the allocation module is configured to:

discard the allocated one from the dependency graph, and allocate another one of the available channels for the route in the dependency graph.

12. The system of claim 9, wherein the allocation module is configured to repeat the allocation and wherein the dependencies module is configured to repeatedly check for cyclic dependencies until the sequence is completely mapped or until the channels are all exhausted.

13. The system of claim 9, wherein the channels comprise at least one of a physical channel and a virtual channel.

14. The system of claim 9, wherein at least one of the route construction module and the allocation module is further configured to address all high level dependencies and network level deadlocks of the multi-core system.

15. The method of claim 1, wherein the specification comprises one or more intercommunication message patterns, wherein the automatically constructing the map of interconnected channels is conducted such that the multi-core system is free of deadlock for all of the one or more intercommunication message patterns.

* * * * *